US012770978B2

(12) United States Patent
Saito et al.

(10) Patent No.: US 12,770,978 B2
(45) Date of Patent: Oct. 20, 2026

(54) AIR ELECTRODE/SEPARATOR ASSEMBLY AND METAL-AIR SECONDARY BATTERY

(71) Applicant: NGK INSULATORS, LTD., Nagoya-City (JP)

(72) Inventors: Naomi Saito, Nagoya-City (JP); Naomi Hashimoto, Nagoya-City (JP)

(73) Assignee: NGK INSULATORS, LTD., Nagoya (JP)

( * ) Notice: Subject to any disclaimer, the term of this patent is extended or adjusted under 35 U.S.C. 154(b) by 468 days.

(21) Appl. No.: 18/395,873

(22) Filed: Dec. 26, 2023

(65) Prior Publication Data

US 2024/0128593 A1 Apr. 18, 2024

Related U.S. Application Data

(63) Continuation of application No. PCT/JP2022/025206, filed on Jun. 23, 2022.

(30) Foreign Application Priority Data

Aug. 26, 2021 (JP) ................................ 2021-138223

(51) Int. Cl.
*H01M 50/497* (2021.01)
*H01M 10/0562* (2010.01)
(Continued)

(52) U.S. Cl.
CPC ..... *H01M 50/497* (2021.01); *H01M 10/0562* (2013.01); *H01M 12/08* (2013.01);
(Continued)

(58) Field of Classification Search
CPC ........ H01M 4/86; H01M 4/90; H01M 4/9016; H01M 10/0562; H01M 12/08;
(Continued)

(56) References Cited

U.S. PATENT DOCUMENTS

| | | | |
|---|---|---|---|
| 9,070,953 | B2 | 6/2015 | Yamada et al. |
| 10,290,847 | B2 | 5/2019 | Kitoh et al. |
| 10,892,530 | B2 | 1/2021 | Yamamura et al. |
| 2017/0214019 | A1 | 7/2017 | Yokoyama et al. |
| 2022/0052399 | A1 | 2/2022 | Hashimoto et al. |

FOREIGN PATENT DOCUMENTS

| | | | | |
|---|---|---|---|---|
| JP | 2017-010914 A | | 1/2017 | |
| JP | 2017010914 | * | 1/2017 | ............ H01M 12/08 |

(Continued)

OTHER PUBLICATIONS

English Translation of JP2017010914.*

(Continued)

*Primary Examiner* — Kiran Quraishi Akhtar
(74) *Attorney, Agent, or Firm* — Muncy, Geissler, Olds & Lowe, P.C.

(57) ABSTRACT

Provided is an air electrode/separator assembly including a hydroxide ion conductive separator including a hydroxide ion conductive solid electrolyte; and an air electrode layer having a thickness of 1,000 nm or smaller that is provided on one side of the hydroxide ion conductive separator and that includes a hydroxide ion conductive material, an electron conductive material, and an air electrode catalyst, provided that the hydroxide ion conductive material may be the same material as the hydroxide ion conductive solid electrolyte or the air electrode catalyst, and provided that the electron conductive material may be the same material as the air electrode catalyst.

7 Claims, 4 Drawing Sheets

(51) Int. Cl.

| | |
|---|---|
| ***H01M 12/08*** | (2006.01) |
| ***H01M 50/443*** | (2021.01) |
| ***H01M 50/449*** | (2021.01) |
| ***H01M 50/46*** | (2021.01) |

(52) U.S. Cl.
CPC ....... *H01M 50/443* (2021.01); *H01M 50/449* (2021.01); *H01M 50/46* (2021.01)

(58) Field of Classification Search
CPC ............. H01M 50/497; H01M 50/443; H01M 50/449; H01M 50/46; H01M 50/417; H01M 50/434; H01M 50/446; H01M 50/463; Y02E 60/10
See application file for complete search history.

(56) References Cited

FOREIGN PATENT DOCUMENTS

| | | | |
|---|---|---|---|
| WO | 2013/073292 | A1 | 5/2013 |
| WO | 2015/146671 | A1 | 10/2015 |
| WO | 2016/067884 | A1 | 5/2016 |
| WO | 2016/076047 | A1 | 5/2016 |
| WO | 2020/246176 | A1 | 12/2020 |
| WO | 2020/246178 | A1 | 12/2020 |

OTHER PUBLICATIONS

International Search Report and Written Opinion (with English translation) dated Sep. 13, 2022 (Application No. PCT/JP2022/025206).

* cited by examiner

AIR ELECTRODE/SEPARATOR ASSEMBLY AND METAL-AIR SECONDARY BATTERY

CROSS-REFERENCE TO RELATED APPLICATIONS

This application is a continuation application of PCT/JP2022/025206 filed Jun. 23, 2022, which claims priority to Japanese Patent Application No. 2021-138223 filed Aug. 26, 2021, the entire contents all of which are incorporated herein by reference.

BACKGROUND OF THE INVENTION

1. Field of the Invention

The present disclosure relates to an air electrode/separator assembly and metal-air secondary battery.

2. Description of the Related Art

One of the innovative battery candidates is a metal-air secondary battery. In the metal-air secondary battery, oxygen as a positive electrode active material is supplied from the air, and the space inside the battery container can thus be utilized to the maximum extent for filling the negative electrode active material, whereby in principle a high energy density is realized. For example, in a zinc-air secondary battery, in which zinc is used as a negative electrode active material, an alkaline aqueous solution such as potassium hydroxide is used as an electrolytic solution, and a separator (partition membrane) is used to prevent a short circuit between positive and negative electrodes. Upon discharge, $O_2$ is reduced on an air electrode (positive electrode) side to generate $OH^-$, while zinc is oxidized on a negative electrode to generate ZnO, as shown in the following reaction formulas.

Positive electrode: $O_2+2H_2O+4e^- \rightarrow 4OH^-$

Negative electrode: $2Zn+4OH^- \rightarrow 2ZnO+2H_2O+4e^-$

By the way, it is known that in zinc secondary batteries such as a zinc-air secondary battery and nickel-zinc secondary battery, metallic zinc in a dendrite form precipitates from a negative electrode upon charge, penetrates voids of a separator such as a nonwoven fabric, and reaches a positive electrode, resulting in occurrence of a short circuit. This short circuit due to such zinc dendrites leads to shorten repeated charge/discharge life. Moreover, another problem with the zinc-air secondary battery is that carbon dioxide in the air passes through the air electrode, dissolves in the electrolytic solution, and precipitates an alkali carbonate to deteriorate the battery performance. Similar problems as described above can occur with lithium-air secondary batteries.

In order to deal with the problems described above, a battery comprising a layered double hydroxide (LDH) separator that blocks the penetration of zinc dendrite while selectively permeating hydroxide ions has been proposed. For example, Patent Literature 1 (WO2013/073292) discloses a zinc-air secondary battery including a LDH separator provided between an air electrode and a negative electrode in order to prevent both the short circuit between the positive and negative electrodes due to zinc dendrite and the inclusion of carbon dioxide. Patent Literature 2 (WO2016/076047) discloses a separator structure comprising an LDH separator fitted or joined to a resin outer frame, wherein the LDH separator has a high denseness such that it has a gas impermeability and/or water impermeability. Moreover, the literature also discloses that the LDH separator can be composited with a porous substrate. Further, Patent Literature 3 (WO2016/067884) discloses various methods for forming an LDH dense membrane on a surface of a porous substrate to obtain a composite material (LDH separator). This method comprises steps of uniformly adhering a starting material that can impart a starting point for LDH crystal growth to the porous substrate, treating hydrothermally the porous substrate in a raw material aqueous solution to form an LDH dense membrane on a surface of the porous substrate.

Moreover, in a field of metal-air secondary batteries such as a zinc-air secondary battery, an air electrode/separator assembly in which an air electrode layer is provided on an LDH separator has been proposed. Patent Literature 4 (WO2015/146671) discloses an air electrode/separator assembly comprising an LDH separator and an air electrode layer thereon, the air electrode layer containing an air electrode catalyst, an electron conductive material, and a hydroxide ion conductive material. Moreover, Patent Literature 5 (WO2020/246176) discloses an air electrode/separator assembly including a hydroxide ion conductive dense separator such as an LDH separator, an interface layer including a hydroxide ion conductive material and an electrically conductive material, and an air electrode layer containing an outermost catalyst layer composed of a porous current collector and a layered double hydroxide (LDH) covering a surface thereof. It is said that the hydroxide ion conductive material included in this interface layer is in the form of a plurality of platy particles, and these plural platy particles are vertically or obliquely bonded on the main surface of the hydroxide ion conductive dense separator. In this Patent Literature 5, the LDH separator is disclosed as a separator containing LDH and/or an LDH-like compound, which may not be called an LDH but is analogous thereto and is defined as a hydroxide and/or an oxide with a layered crystal structure.

CITATION LIST

Patent Literature

Patent Literature 1: WO2013/073292
Patent Literature 2: WO2016/076047
Patent Literature 3: WO2016/067884
Patent Literature 4: WO2015/146671
Patent Literature 5: WO2020/246176

SUMMARY OF THE INVENTION

By the way, since an air electrode reaction in a metal-air battery occurs at a three-phase interface (composed of a hydroxide ion conductive phase, an electron conductive phase, and a gas phase) where hydroxide ions, oxygen, and electrons are all present, as much reaction field as possible is desirably secured within the air electrode. In this respect, a metal-air battery that employs a general polymeric porous separator facilitates an electrolytic solution to penetrate into the air electrode due to porous nature of the separator. Therefore, the electrolytic solution can play a roll of hydroxide ion conduction in the air electrode, whereby high ion conductivity can be expected. The electrolytic solution that is a strong alkali, on the other hand, has a low dissolved oxygen content, resulting in shortage of oxygen supply to a catalyst when covered with the electrolytic solution. As a result, most of the reactions occur on the catalyst present at an interface between the electrolytic solution and a gas phase, i.e., the reaction field is surmised to be limited to the interface between the electrolytic solution and the gas phase. Since the metal-air battery to which such a polymeric porous separator has been applied is also an open system, there is a problem that potassium carbonate is formed within the air electrode by carbon dioxide in the air to clog up pores, and resistance of the electrolytic solution gradually increases due to the carbon dioxide that has permeated the separator.

Meanwhile, in a metal-air battery using a hydroxide ion conductive separator such as an LDH separator, denseness of the separator can inhibit an electrolytic solution from entering an air electrode. Therefore, the aforementioned problems caused by the carbon dioxide can be avoided. However, in order to generate reaction in the air electrode, a hydroxide ion conductive material in solid phase is required to be arranged. In this case, while hydroxide ion conduction can expand as much reaction field as possible, compared to an air battery using an electrolytic solution as a hydroxide ion conductive medium (air battery to which a polymeric porous separator has been applied), the hydroxide ion conductive material in form of solid itself has higher resistance than that of the electrolytic solution, and furthermore interfacial resistance between the solids cannot also be ignored, whereby for conduction or diffusion of electrons and gas, conduction or diffusion of hydroxide ions may become a bottleneck (rate-determining step).

Nevertheless, as described above, a metal-air secondary battery using a hydroxide ion conductive dense separator such as an LDH separator has an excellent advantage of being capable of preventing both a short circuit between positive and negative electrodes due to metal dendrites and an inclusion of carbon dioxide. Further, it has an advantage of being capable of inhibiting evaporation of water contained in the electrolytic solution due to denseness of the hydroxide ion conductive dense separator. Therefore, it would be convenient if the problems accompanying conduction or diffusion of hydroxide ions could be reduced, making the best use of these advantages.

The present inventors have recently found that an air electrode layer having a thickness of 1,000 nm or smaller being provided on one side of a hydroxide ion conductive separator, reduces diffusion resistance and interfacial resistance between solids due to conduction or diffusion of electrons, gas, and hydroxide ions, whereby an air electrode/separator assembly that can realize a reduction in battery resistance, can be provided.

Therefore, an object of the present invention is to provide an air electrode/separator assembly in which diffusion resistance and interfacial resistance between solids due to conduction or diffusion of electrons, gas, and hydroxide ions, are reduced, thereby enabling realization of a reduction in battery resistance.

The present invention provides the following aspects:

[Aspect 1]

An air electrode/separator assembly, comprising:

- a hydroxide ion conductive separator comprising a hydroxide ion conductive solid electrolyte; and
- an air electrode layer having a thickness of 1,000 nm or smaller that is provided on one side of the hydroxide ion conductive separator and that comprises a hydroxide ion conductive material, an electron conductive material, and an air electrode catalyst, provided that the hydroxide ion conductive material may be the same material as the hydroxide ion conductive solid electrolyte or the air electrode catalyst, and provided that the electron conductive material may be the same material as the air electrode catalyst.

[Aspect 2]

The air electrode/separator assembly according to aspect 1, further comprising an interface layer between the hydroxide ion conductive separator and the air electrode layer, wherein the interface layer comprises:

- a plurality of platy particles composed of a hydroxide ion conductive solid electrolyte grown in a direction away from a surface of the hydroxide ion conductive separator, and
- an electron conductive material provided so as to fill a gap between the plurality of platy particles and/or unevenness formed by the plurality of platy particles.

[Aspect 3]

The air electrode/separator assembly according to aspect 2, wherein the air electrode layer comprises:

- a plurality of electron conductive segments composed of the electron conductive material, the electron conductive segments being provided on the interface layer with a gap between each other; and
- the hydroxide ion conductive material and the air electrode catalyst that are provided on the electron conductive segment.

[Aspect 4]

The air electrode/separator assembly according to aspect 2 or 3, wherein the interface layer has a thickness of 150 nm or smaller and wherein the air electrode layer has a thickness of 300 nm or smaller.

[Aspect 5]

The air electrode/separator assembly according to aspect 1, wherein the air electrode layer comprises a plurality of platy particles composed of the hydroxide ion conductive solid electrolyte grown in a direction away from a surface of the hydroxide ion conductive separator,

- wherein the plurality of platy particles is at least partially coated with the electron conductive material, and
- wherein the air electrode catalyst is supported on the plurality of platy particles at least partially coated with the electron conductive material.

[Aspect 6]

The air electrode/separator assembly according to aspect 5, wherein the air electrode layer has a thickness of 800 nm or smaller.

[Aspect 7]

The air electrode/separator assembly according to any one of aspects 1 to 6, wherein the hydroxide ion conductive material comprised in the air electrode layer is a layered double hydroxide (LDH) and/or an LDH-like compound,

- wherein the electron conductive material comprised in the air electrode layer is at least one selected from the group consisting of a metallic material, a conductive ceramic, and a carbon material, and
- wherein the air electrode catalyst comprised in the air electrode layer is at least one selected from the group consisting of a layered double hydroxide (LDH) and other metal hydroxide, a metal oxide, a metal nanoparticle, and a carbon material.

[Aspect 8]

The air electrode/separator assembly according to any one of aspects 2 to 4, wherein the hydroxide ion conductive material comprised in the interface layer is a layered double hydroxide (LDH) and/or an LDH-like compound.

[Aspect 9]

The air electrode/separator assembly according to any one of aspects 1 to 8, wherein the hydroxide ion conductive solid electrolyte is a layered double hydroxide (LDH) and/or an LDH-like compound, whereby the hydroxide ion conductive separator forms an LDH separator.

[Aspect 10]

The air electrode/separator assembly according to aspect 9, wherein the LDH separator is composited with a porous substrate.

[Aspect 11]

A metal-air secondary battery, comprising the air electrode/separator assembly according to any one of aspects 1 to 10, a metal negative electrode, and an electrolytic solution, wherein the electrolytic solution is separated from the air electrode layer by the hydroxide ion conductive separator interposed therebetween.

DETAILED DESCRIPTION OF THE INVENTION

Air Electrode/Separator Assembly

Figure 1:
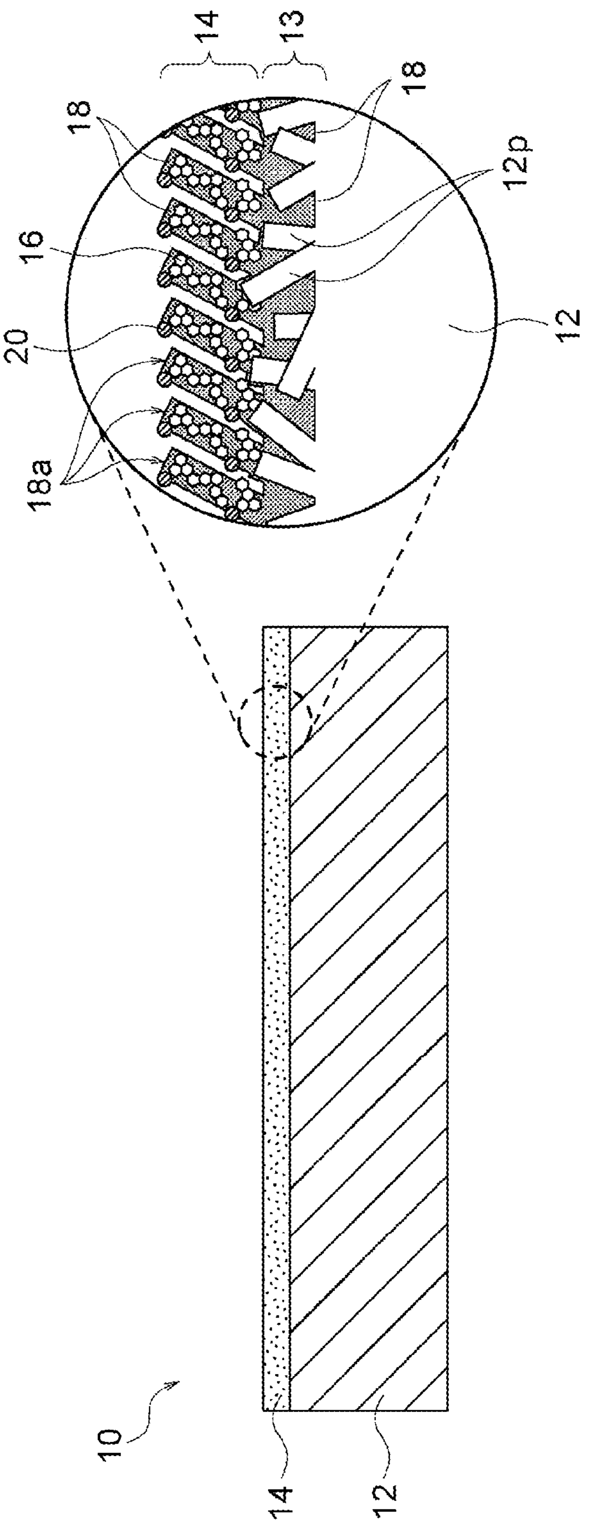
FIG. 1 is a schematic cross-sectional view conceptually illustrating an air electrode/separator assembly according to one aspect of the present invention and an enlarged view thereof.

FIG. 1 shows an example of an air electrode/separator assembly by the present invention. An air electrode/separator assembly 10 shown in FIG. 1 includes a hydroxide ion conductive separator 12 and an air electrode layer 14 provided on one side of hydroxide ion conductive separator 12. Hydroxide ion conductive separator 12 includes a hydroxide ion conductive solid electrolyte. Air electrode layer 14 includes a hydroxide ion conductive material 16, an electron conductive material 18, and an air electrode catalyst 20. However, hydroxide ion conductive material 16 may be the same material as the hydroxide ion conductive solid electrolyte or air electrode catalyst 20. Electron conductive material 18 may also be the same material as air electrode catalyst 20. A thickness of air electrode layer 14 is 1,000 nm or smaller. In such a manner, air electrode layer 14 having a thickness of 1,000 nm or smaller being provided on one side of hydroxide ion conductive separator 12, reduces diffusion resistance and interfacial resistance between solids due to conduction or diffusion of electrons, gas, and hydroxide ions, from which a reduction in battery resistance can be realized.

In other words, as described above, in the metal-air battery using a hydroxide ion conductive separator such as an LDH separator, denseness of the separator can inhibit an electrolytic solution from entering an air electrode. Therefore, the aforementioned problems caused by the carbon dioxide can be avoided. However, in order to generate reaction in the air electrode, a hydroxide ion conductive material in solid phase is required to be arranged. In this case, while the hydroxide ion conduction can expand as much reaction field as possible, compared to an air battery using an electrolytic solution as a hydroxide ion conductive medium (air battery to which a polymeric porous separator has been applied), the hydroxide ion conductive material in form of solid itself has higher resistance than that the electrolytic solution, and furthermore, the interfacial resistance between the solids cannot also be ignored, whereby for conduction or diffusion of electrons and gas, conduction or diffusion of hydroxide ions may become a bottleneck (rate-determining step). In this respect, such a problem is conveniently solved according to air electrode/separator assembly 10. This is because a thickness of air electrode layer 14 being as extremely thin as 1,000 nm or smaller allows an air electrode reaction to be completed in a minute space within air electrode layer 14. That is, a distance of movement of each of electrons, gas, and hydroxide ions (in particular a diffusion distance of each of gas and hydroxide ions, which is prone to cause a problem of diffusion resistance) can be shortened in such a minute space, resulting in making it possible to reduce diffusion resistance and interfacial resistance between solids. Thus, a reduction in battery resistance can be realized in a battery incorporating air electrode/separator assembly 10. Moreover, since air electrode layer 14 is extremely thin, no waste results in a material constituting air electrode layer 14, to be able to form air electrode layer 14 using a very small amount of material, whereby even an expensive catalyst to be used for air electrode layer 14 can be effectively used.

Besides, air electrode/separator assembly 10 can be made extremely thin, thereby making it possible for air electrode/separator assembly 10 to have flexibility. In this case, air electrode/separator assembly 10 can be bent even when pressurized, and accordingly, battery components including other components (negative electrode, etc.) that are housed in a battery container can be pressurized in the direction such that each battery components are adhered to one another. Such pressurization is particularly advantageous when a plurality of air electrode/separator assemblies 10 are alternately incorporated into a battery container together with a plurality of metal negative electrodes to constitute a stacked-cell battery. Similarly, it is also advantageous when a plurality of stacked-cell batteries are housed in one module container to constitute a battery module. For example, pressurizing a zinc-air secondary battery minimizes the gap (preferably eliminates the gap) between the negative electrode and hydroxide ion conductive separator 12 which gap allows growth of zinc dendrite, whereby effective inhibition of the zinc dendrite propagation can be expected. For example, a preferred thickness of air electrode/separator assembly 10 is from 10 to 200 μm, more preferably from 15 to 180 μm, and still more preferably from 20 to 130 μm.

Hydroxide ion conductive separator 12 is a separator containing a hydroxide ion conductive solid electrolyte, and is defined as a separator that allows hydroxide ions to selectively pass by solely utilizing hydroxide ion conductivity of the hydroxide ion conductive solid electrolyte. Therefore, the hydroxide ion conductive separator has gas impermeability and/or water impermeability, particularly gas impermeability. Namely, the hydroxide ion conductive material constitutes all or a part of the hydroxide ion conductive dense separator having high denseness such that it exhibits gas impermeability and/or water impermeability. The hydroxide ion conductive dense separator may be composited with a porous substrate.

Figure 3:
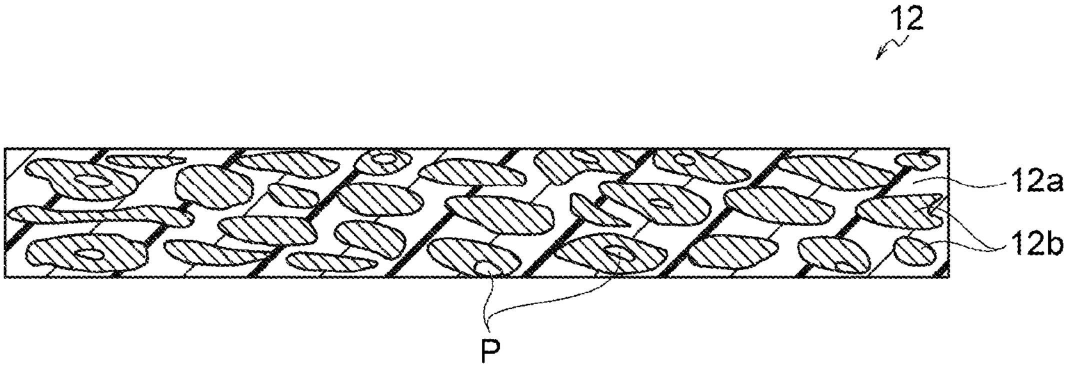
FIG. 3 is a schematic cross-sectional view conceptually illustrating a hydroxide ion conductive separator used in the present invention.

Preferably, the hydroxide ion conductive solid electrolyte is a layered double hydroxide (LDH) and/or an LDH-like compound (hereinafter collectively referred to as a hydroxide ion conductive layered compound), whereby hydroxide ion conductive separator 12 forms an LDH separator. In other words, the LDH separator is a separator containing LDH and/or the LDH-like compound (hereinafter collectively referred to as a hydroxide ion conductive layered compound), and is defined as a separator that allows hydroxide ions to selectively pass, by solely utilizing hydroxide ion conductivity of the hydroxide ion conductive layered compound. The "LDH-like compound" herein is a hydroxide and/or oxide having a layered crystal structure analogous to LDH but is a compound that may not be called LDH, and it can be said to be an equivalent of LDH. However, according to a broad sense of definition, it can be appreciated that "LDH" encompasses not only LDH but also LDH-like compounds. Such LDH separators can be those known as disclosed in Patent literatures 1 to 5 and are preferably LDH separators composited with porous substrates. Hydroxide ion conductive separator 12 that is a particularly preferred LDH separator contains a porous substrate 12*a* made of a polymeric material and a hydroxide ion conductive layered compound 12*b* that clogs pores P of the porous substrate, as conceptually shown in FIG. 3, and an LDH separator of this type will be described later. The porous substrate containing a polymer material can be bent even when pressurized and hardly cracks, and accordingly, battery components including the substrate and other components (negative electrode, etc.) that are housed in a battery container can be pressurized in the direction such that each battery components are adhered to one another. Such pressurization is particularly advantageous when a plurality of air electrode/separator assemblies 10 are alternately incorporated into a battery container together with a plurality of metal negative electrodes to constitute a stacked-cell battery. Similarly, it is also advantageous when a plurality of stacked-cell batteries are housed in one module container to constitute a battery module. For example, pressurizing a zinc-air secondary battery minimizes the gap (preferably eliminates the gap) between the negative electrode and LDH separator which gap allows growth of zinc dendrite, whereby effective inhibition of the zinc dendrite propagation can be expected.

Air electrode layer 14 includes hydroxide ion conductive material 16, electron conductive material 18, and air electrode catalyst 20. However, hydroxide ion conductive material 16 may be the same material as the hydroxide ion conductive solid electrolyte or air electrode catalyst 20, and examples of such materials include an LDH containing a transition metal (for example, Ni—Fe-LDH, Co—Fe-LDH, and Ni—Fe—V-LDH).

On the other hand, examples of the hydroxide ion conductive material which does not serve as the air electrode catalyst include Mg—Al-LDH. The electron conductive material 18 may be the same material as the air electrode catalyst 20, and examples of such a material include carbon materials, metal nanoparticles, nitrides such as TiN, and $LaSr_3Fe_3O_{10}$.

The hydroxide ion conductive material 16 contained in the air electrode layer 14 is not particularly limited as long as the material has a hydroxide ion conductivity, and it is preferably LDH and/or LDH-like compounds. The composition of LDH is not particularly limited, and preferably has a basic composition represented by the formula: $M^{2+}_{1-x}M^{3+}_x(OH)_2A^{n-}_{x/n}\cdot mH_2O$, wherein $M^{2+}$ is at least one divalent cation, $M^{3+}$ is at least one trivalent cation, $A^{n-}$ is an n-valent anion, n is an integer of 1 or more, x is 0.1 to 0.4, and m is an arbitrary real number. In the above formula, $M^{2+}$ can be an arbitrary divalent cation, and preferred examples thereof include $Ni^{2+}$, $Mg^{2+}$, $Ca^{2+}$, $Mn^{2+}$, $Fe^{2+}$, $Co^{2+}$, $Cu^{2+}$, and $Zn^{2+}$. $M^{3+}$ can be an arbitrary trivalent cation, and preferred examples thereof include $Fe^{3+}$, $V^{3+}$, $Al^{3+}$, $Co^{3+}$, $Cr^{3+}$, and $In^{3+}$. In particular, in order for LDH to have both catalytic performance and hydroxide ion conductivity, $M^{2+}$ and $M^{3+}$ each are desirably a transition metal ions. From this viewpoint, more preferred $M^{2+}$ is a divalent transition metal ion such as $Ni^{2+}$, $Mn^{2+}$, $Fe^{2+}$, $Co^{2+}$, and $Cu^{2+}$, and particularly preferably $Ni^{2+}$, and more preferred $M^{3+}$ is a trivalent transition metal ion such as $Fe^{3+}$, $V^{3+}$, $Co^{3+}$, and $Cr^{3+}$, and particularly preferably $Fe^{3+}$, $V^{3+}$, and/or $Co^{3+}$. In this case, some of $M^{2+}$ may be replaced with a metal ion other than the transition metal, such as $Mg^{2+}$, $Ca^{2+}$, and $Zn^{2+}$, and some of $M^{3+}$ may be replaced with a metal ion other than the transition metal, such as $Al^{3+}$ and $In^{3+}$. $A^{n-}$ can be an arbitrary anion. Preferred examples thereof include $NO^{3-}$, $Co_3^{2-}$, $SO_4^{2-}$, $OH^-$, $Cl^-$, $I^-$, $Br^-$, and $F^-$, and it is more preferably $NO^{3-}$ and/or $Co_3^{2-}$. Therefore, in the above formula, it is preferred that $M^{2+}$ include $Ni^{2+}$, $M^{3+}$ include $Fe^{3+}$, and $A^{n-}$ include $NO^{3-}$ and/or $Co_3^{2-}$. n is an integer of 1 or more, and preferably 1 to 3. x is 0.1 to 0.4 and preferably 0.2 to 0.35. m is an arbitrary real number and more specifically greater than or equal to 0, typically a real number or an integer greater than 0 or greater than or equal to 1.

The electron conductive material 18 contained in the air electrode layer 14 is preferably at least one selected from the group consisting of metallic material, electrically conductive ceramics, and carbon materials. In particular, examples of the electrically conductive ceramics include $LaNiO_3$ and $LaSr_3Fe_3O_{10}$. Examples of carbon materials include, but are not limited to, carbon black, graphite, carbon nanotubes, graphene, reduced graphene oxide, and any combination thereof, and various other carbon materials can also be used. Examples of the metal material include nickel, titanium, stainless steel, and the like.

The air electrode catalyst 20 contained in the air electrode layer 14 is preferably at least one selected from the group consisting of LDH and other metal hydroxides, metal oxides, metal nanoparticles, and carbon materials, and more preferably at least one selected from the group consisting of LDH, metal oxides, metal nanoparticles, and carbon materials. LDH is as described above for the hydroxide ion conductive material, which is particularly preferable in terms of performing both the functions of the air electrode catalyst and the hydroxide ion conductive material. Examples of the metal hydroxide include Ni—Fe—OH, Ni—Co—OH and any combination thereof, which may further contain a third metal element. Examples of the metal oxide include $Co_3O_4$, $LaNiO_3$, $LaSr_3Fe_3O_{10}$, and any combination thereof. Examples of the metal nanoparticle (typically metal particle having a particle diameter of 2 to 30 nm) include Pt, Ni—Fe alloy. Examples of the carbon material include, but are not limited to, carbon black, graphite, carbon nanotubes, graphene, reduced graphene oxide, and any combination thereof, as described above, and various other carbon materials can also be used. Preferably the carbon material further contains a metal element and/or other elements such as nitrogen, boron, phosphorus, and sulfur, in view of improving the catalytic performance of the carbon material.

A thickness of air electrode layer 14 is 1,000 nm or smaller, preferably from 30 to 800 nm, more preferably from 50 to 600 nm, and still more preferably from 80 to 500 nm.

As a preferred embodiment of the air electrode/separator assembly according to the first embodiment of the present invention, the first and second embodiments will be described later.

First Embodiment

As shown in FIG. 1, air electrode/separator assembly 10 according to the first embodiment further includes an interface layer 13 between hydroxide ion conductive separator 12 and air electrode layer 14. Interface layer 13 includes a plurality of platy particles 12*p* composed of a hydroxide ion conductive solid electrolyte grown in a direction away from a surface of hydroxide ion conductive separator 12 (vertical or oblique direction to the surface), and electron conductive material 18 provided so as to fill a gap between the plurality of platy particles 12*p* and/or unevenness formed by the plurality of platy particles 12*p*. In the present embodiment, by filling the gap and the unevenness formed due to platy particles 12*p* grown in a direction away from hydroxide ion conductive separator 12, with electron conductive material 18, the resulting layer can be used as interface layer 13 responsible for electron conduction in an in-plane direction of hydroxide ion conductive separator 12 and hydroxide ion conduction in a direction perpendicular to the main surface of hydroxide ion conductive separator 12 (thickness directions of hydroxide ion conductive separator 12 and air electrode layer 14). In particular, since platy particles 12*p* of hydroxide ion conductive solid electrolytes such as LDH and/or the LDH-like compound, have a property of conducting hydroxide ions in a plate plane direction (the (003) plane direction in the case of LDH), by platy particles 12*p* being arranged in a direction away from a surface of LDH separator 12, interfacial resistance between electrode layer 14 and LDH separator 12 is surmised to be reduced. In particular, when observing the microstructure of the surface of LDH separator 12 fabricated according to a known method, LDH platy particles 12*p* are typically grown in the direction away from a surface of LDH separator 12, as shown in FIG. 1, and in the present invention, interfacial resistance can be significantly reduced by the presence of platy particle 12*p* (hydroxide ion conductive material 16) in such a state and electron conductive material 18 between LDH separator 12 and air electrode layer 14.

Air electrode layer 14 in the first embodiment preferably includes a plurality of electron conductive segments 18*a* that is provided on interface layer 13 with a gap between each other and that is composed of electron conductive material 18; and hydroxide ion conductive material 16 and air electrode catalyst 20 that are provided on electron conductive segment 18*a*. In this manner, air can be efficiently taken into air electrode layer 14 and an area of the reaction field (three-phase interface composed of a hydroxide ion conductive phase, an electron conductive phase and a gas phase) can be increased.

A thickness of interface layer 13 in the first embodiment is preferably 150 nm or smaller, more preferably from 30 to 150 nm, and still more preferably from 50 to 130 nm. A thickness of air electrode layer 14 in the first embodiment is also preferably 300 nm or smaller, more preferably from 20 to 250 nm, preferably from 40 to 200 nm, and still more preferably from 50 to 180 nm. Hydroxide ion conductive material 16 included in interface layer 13 in the first embodiment is preferably LDH and/or the LDH-like compound. In the case of hydroxide ion conductive separator 12 being an LDH separator, platy particles of LDH and/or the LDH-like compound are present on a surface of a typical LDH separator, and therefore these particles can be used as platy particles 12*p*.

Air electrode/separator assembly 10 according to the first embodiment can be produced, for example, by the following procedure:

1) Electron conductive material 18 is deposited on a surface of hydroxide ion conductive separator 12 so as to fill a gap and unevenness due to platy particles 12*p* of the hydroxide ion conductive solid electrolyte grown from hydroxide ion conductive separator 12 such as an LDH separator. Electron conductive material 18 used in this case may be a composite of a highly water repellent material and an electron conductive material.
2) On a surface in which the gap and the unevenness of hydroxide ion conductive separator 12 obtained in 1) above have been filled with electron conductive material 18, electron conductive material 18 is deposited so that a plurality of electron conductive segments 18*a* that are separated from each other, is deposited to be able to ensure a gap.
3) Air electrode catalyst 20 is deposited on electron conductive segments 18*a* obtained in 2) above. In this case, air electrode catalyst 20 may also function as hydroxide ion conductive material 16 or electron conductive material 18.
4) A precursor of hydroxide ion conductive material 16 (for example, LDH) is deposited on electron conductive segment 18*a* on which air electrode catalyst 20 was deposited in 3) above. Examples of such a precursor include a metallic material such as Ni—Fe alloy.
5) The material obtained in 4) above is subjected to alkali treatment to convert the precursor into hydroxide ion conductive material 16 (for example, LDH). Thus air electrode/separator assembly 10 according to the first embodiment is obtained.

The deposition methods (or film formation methods) of each material in from 1) to 4) above are not particularly limited as long as air electrode layer 14 having a desired thickness and function can be formed, but a deposition method (or film formation method) via vapor phase is advantageous because the method facilitates thickness control and correspondence to various compositions. Preferred examples of the deposition method via gas phase include a sputtering method, a laser ablation method, and the like, with bipolar sputtering, magnetron sputtering, and the like, being particularly preferred. In the case of using the laser ablation, it is also possible to deposit hydroxide ion conductive material 16 (for example, LDH) itself instead of a precursor of hydroxide ion conductive material 16 (for example, LDH) in 4) above, and in this case, 5) above can be omitted.

Second Embodiment

Figure 2:
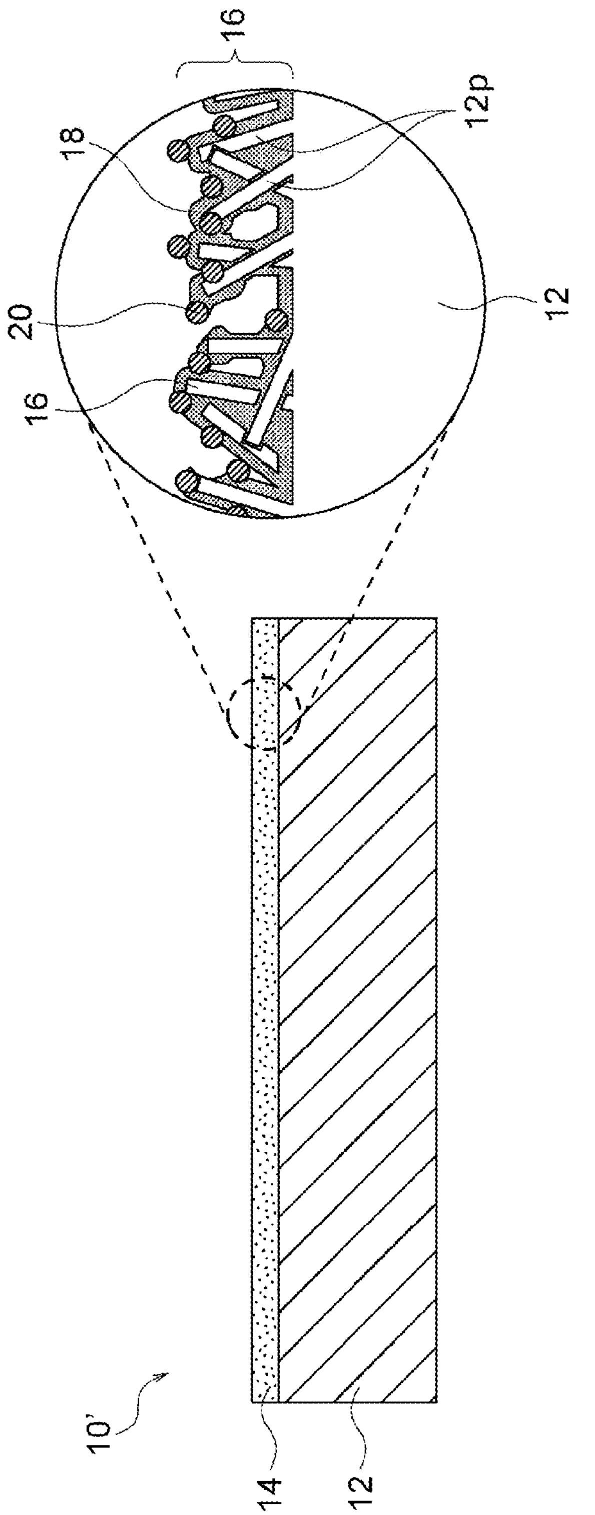
FIG. 2 is a schematic cross-sectional view conceptually illustrating an air electrode/separator assembly according to another aspect of the present invention and an enlarged view thereof.

FIG. 2 shows an air electrode/separator assembly 10' according to the second embodiment. In air electrode/separator assembly 10', air electrode layer 14 includes a plurality of platy particles 12*p* composed of a hydroxide ion conductive solid electrolyte (corresponding to hydroxide ion conductive material 16) grown in a direction away from a surface of hydroxide ion conductive separator 12 (direction vertical or oblique to the surface). These plurality of platy particles 12*p* are at least partially coated with electron conductive material 18. Air electrode catalyst 20 is then supported on the plurality of platy particles 12*p* at least partially coated with electron conductive material 18. In this embodiment, platy particle 12*p* grown in a direction away from hydroxide ion conductive separator 12 can be used as hydroxide ion conductive material 16. In a case of hydroxide ion conductive separator 12 being an LDH separator, platy particles of LDH and/or an LDH-like compound are present on a surface of a typical LDH separator, and therefore these particles can be used as platy particles 12*p*.

A thickness of air electrode layer 14 in the second embodiment is preferably 800 nm or smaller, more preferably from 100 to 800 nm, preferably from 150 to 700 nm, more preferably from 200 to 600 nm, and still more preferably from 300 to 500 nm.

Air electrode/separator assembly 10' according to the second embodiment can be produced, for example, by the following procedure:

1) Electron conductive material 18 is deposited along unevenness due to platy particles 12*p* of the hydroxide ion conductive solid electrolyte grown from hydroxide ion conductive separator 12 such as an LDH separator. In this case, desirably electron conductive material 18 incompletely or partially cover the platy particles 12P instead of completely covering it so that for example, a gap to the extent that water vapor or an oxygen gas can permeate the gap, is moderately present. In such a manner, the reaction field (three-phase interface composed of a hydroxide ion conductive phase, an electron conductive phase, and a gas phase) can be efficiently secured.
2) Electrode catalyst 20 is deposited on a surface of hydroxide ion conductive separator 12 on which electron conductive material 18 obtained in 1) above has been deposited. Thus air electrode/separator assembly 10' according to the second embodiment is obtained.

Note, however, as a pretreatment prior to 1) above, the hydroxide ion conductive solid electrolyte (for example, LDH) present on a surface of hydroxide ion conductive separator 12 such as an LDH separator, may be subjected to roughening treatment. For example, the roughening treatment can be carried out by immersing the LDH separator in a thin acid for a short time and washing it away (i.e., by allowing an LDH present on the surface of the LDH separator to be eroded with an acid). Alternatively, the roughening treatment may be performed by depositing an LDH precursor on a surface of the LDH separator, heating the LDH precursor or subjecting it to alkali treatment or the like to form a coarse LDH particle.

Deposition methods (or film formation methods) of each material in 1) and 2) above can employ the same methods as those in the first embodiment. For example, as the step of 1) above, on a surface of a LDH separator in which a platy particle of Mg—Ti—Al-LDH has grown in a direction away from the surface, nickel (or carbon) may be deposited by sputtering using a nickel target (or a carbon target) on the surface. As the step of 2) above, by using a cobalt target, a manganese target, and a carbon target, a carbon nanoparticle doped with manganese and cobalt may also be deposited as air electrode catalyst 20.

Metal-Air Secondary Battery

As described above, air electrode/separator assembly 10 is preferably used for a metal-air secondary battery. Namely, a preferred aspect of the present invention provides a metal-air secondary battery comprising air electrode/separator assembly 10, a metal negative electrode, and an electrolytic solution, wherein the electrolytic solution is separated from air electrode layer 14 by LDH separator 12 interposed therebetween. A zinc-air secondary battery including a zinc electrode as a metal negative electrode is particularly preferable. Further, a lithium-air secondary battery including a lithium electrode as a metal negative electrode may be used.

LDH Separator According to Preferred Aspect

LDH separator 12 according to a preferred embodiment of the present invention will be described below. As described above, LDH separator 12 of the present embodiment contains a porous substrate 12*a* and a hydroxide ion conductive layered compound 12*b* which is the LDH and/or LDH-like compound, as conceptually shown in FIG. 3. In FIG. 2, the region of hydroxide ion conductive layered compound 12*b* is drawn so as not to be connected between the upper surface and the lower surface of LDH separator 12, but it is because the figure is drawn two-dimensionally as a cross section. When the depth thereof is three-dimensionally taken into account, the region of hydroxide ion conductive layered compound 12*b* is connected between the upper surface and the lower surface of LDH separator 12, whereby the hydroxide ion conductivity of LDH separator 12 is secured. Porous substrate 12*a* is made of a polymer material, and the pores of porous substrate 12*a* are clogged up with hydroxide ion conductive layered compound 12*b*. However, the pores of porous substrate 12*a* may not be completely clogged up, and residual pores P can be slightly present. By clogging up the pores of polymer porous substrate 12*a* with hydroxide ion conductive layered compound 12*b* to make the substrate highly densified in this way, LDH separator 12 capable of even more effectively inhibiting short circuits due to zinc dendrites can be provided.

Moreover, LDH separator 12 of the present embodiment has excellent flexibility and strength in addition to desirable ion conductivity required of a separator due to the hydroxide ion conductivity of hydroxide ion conductive layered compound 12*b*. This is due to the flexibility and strength of polymer porous substrate 12*a* itself contained in LDH separator 12. Namely, since LDH separator 12 is densified so that the pores of polymer porous substrate 12*a* are sufficiently clogged up with hydroxide ion conductive layered compound 12*b*, polymer porous substrate 12*a* and hydroxide ion conductive layered compound 12*b* are integrated in complete harmony as a highly composited material, and therefore the rigidity and brittleness due to hydroxide ion conductive layered compound 12*b*, which is a ceramic material, can be said to be offset or reduced by the flexibility and strength of polymer porous substrate 12*a*.

LDH separator 12 of the present embodiment desirably has extremely few residual pores P (the pores not clogged up with hydroxide ion conductive layered compound 12*b*). Due to residual pores P, LDH separator 12 has, for example, an average porosity of 0.03% or more and less than 1.0%, preferably 0.05% or more and 0.95% or less, more preferably 0.05% or more and 0.9% or less, still more preferably 0.05 to 0.8%, and most preferably 0.05 to 0.5%. With an average porosity within the above range, the pores of porous substrate 12*a* are sufficiently clogged up with hydroxide ion conductive layered compound 12*b* to provide an extremely high denseness, which therefore can inhibit short circuits due to zinc dendrites even more effectively. Further, significantly high ionic conductivity can be realized, and LDH separator 12 can exhibit a sufficient function as a hydroxide ion conductive dense separator. The measurement of the average porosity can be carried out by a) polishing the cross section of the LDH separator with a cross section polisher (CP), and b) using an FE-SEM (field-emission scanning electron microscope) at a magnification of 50,000× to acquire images of two fields of vision of the cross-sectional of the functional layer, and c) calculating the porosity of each of the two fields of vision by using an image inspection software (for example, HDevelop, manufactured by MVTec Software GmbH) based on the image data of the acquired cross-sectional image and determining the average value of the obtained porosities.

LDH separator 12 is a separator containing hydroxide ion conductive layered compound 12*b*, and separates a positive electrode plate and a negative electrode plate such that hydroxide ions can be conducted when the separator is incorporated in a zinc secondary battery. Namely LDH separator 12 exhibits a function as a hydroxide ion conductive dense separator. Therefore, LDH separator 12 has gas impermeability and/or water impermeability. Thus, LDH separator 12 is preferably densified so as to have gas impermeability and/or water impermeability. As described in Patent Literatures 2 and 3, "having gas impermeability" herein means that even when helium gas is brought into contact with one side of the object to be measured in water at a differential pressure of 0.5 atm, no bubbles are generated due to the helium gas from another surface side. Further, as used herein, "having water impermeability" means that water in contact with one side of the object to be measured does not permeate to the other side as described in Patent Literatures 2 and 3. Namely, LDH separator 12 having gas impermeability and/or water impermeability means LDH separator 12 having a high degree of denseness such that it does not allow gas or water to pass through, and means that LDH separator 12 is not a porous film or other porous material that has water permeability or gas permeability. In this way, LDH separator 12 selectively allows hydroxide ions alone to pass through due to its hydroxide ion conductivity and can exhibit a function as a battery separator. Therefore, the configuration is extremely effective in physically blocking penetration of the separator by the zinc dendrite generated upon charge to prevent a short circuit between the positive and negative electrodes. Since LDH separator 12 has hydroxide ion conductivity, it is possible to efficiently move the required hydroxide ions between the positive electrode plate and the negative electrode plate, and to realize the charge/discharge reaction in the positive electrode plate and the negative electrode plate.

LDH separator 12 preferably has a He permeability of 3.0 cm/min-atm or less per unit area, more preferably 2.0 cm/min-atm or less, and still more preferably 1.0 cm/min-atm or less. A separator having a He permeability of 3.0 cm/min-atm or less can extremely effectively inhibit Zn permeation (typically permeation of zinc ion or zinc acid ion) in an electrolytic solution. It is considered in principle that due to such significant inhibition of Zn permeation, the separator of the present embodiment can inhibit effectively the growth of zinc dendrite when used in a zinc secondary battery. The He permeability is measured by supplying He gas to one surface of the separator to allow the He gas to pass through the separator, and calculating the He permeability to evaluate the denseness of the hydroxide ion conductive dense separator. The He permeability is calculated by the formula of F/(P×S) by using the permeation amount F of the He gas per unit time, the differential pressure P applied to the separator when the He gas permeates, and the membrane area S through which the He gas permeates. By evaluating the gas permeability using the He gas in this way, it is possible to evaluate the presence or absence of denseness at an extremely high level, and as a result, it is possible to effectively evaluate a high degree of denseness such that substances other than hydroxide ions (in particular Zn bringing about zinc dendrite growth) can be permeated as little as possible (only a very small amount is permeated). This is because an He gas has the smallest constituent unit among a wide variety of atoms or molecules that can form a gas and also has extremely low reactivity. Namely, He constitutes a He gas by a single He atom without forming a molecule. In this respect, hydrogen gas is composed of $H_2$ molecules, and the He atom alone is smaller as a gas constituent unit. In the first place, $H_2$ gas is dangerous because it is a flammable gas. Then, by adopting the index of He gas permeability defined by the above formula, it is possible to easily evaluate the denseness objectively regardless of the difference in various sample sizes and measurement conditions. In this way, it is possible to easily, safely and effectively evaluate whether or not the separator has sufficiently high denseness suitable for a zinc secondary battery separator.

Figure 4A:
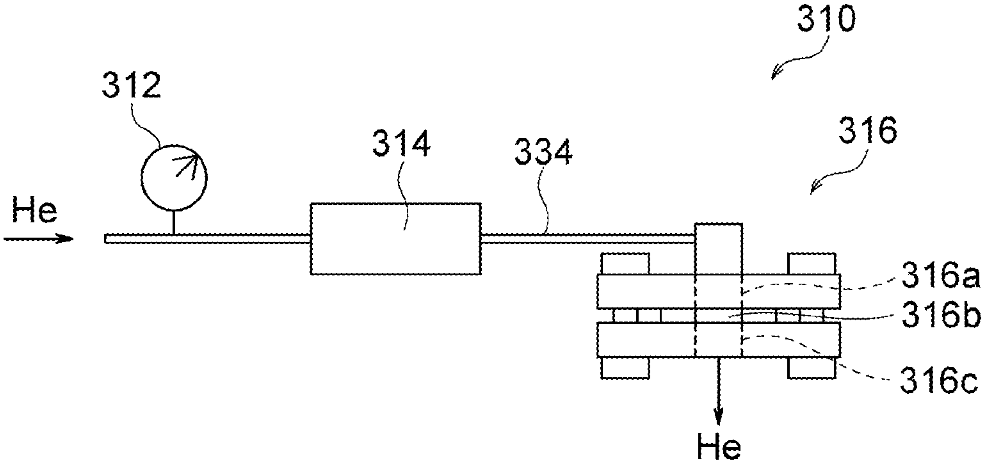
FIG. 4A is a conceptual view of an example of the He permeability measurement system.
Figure 4B:
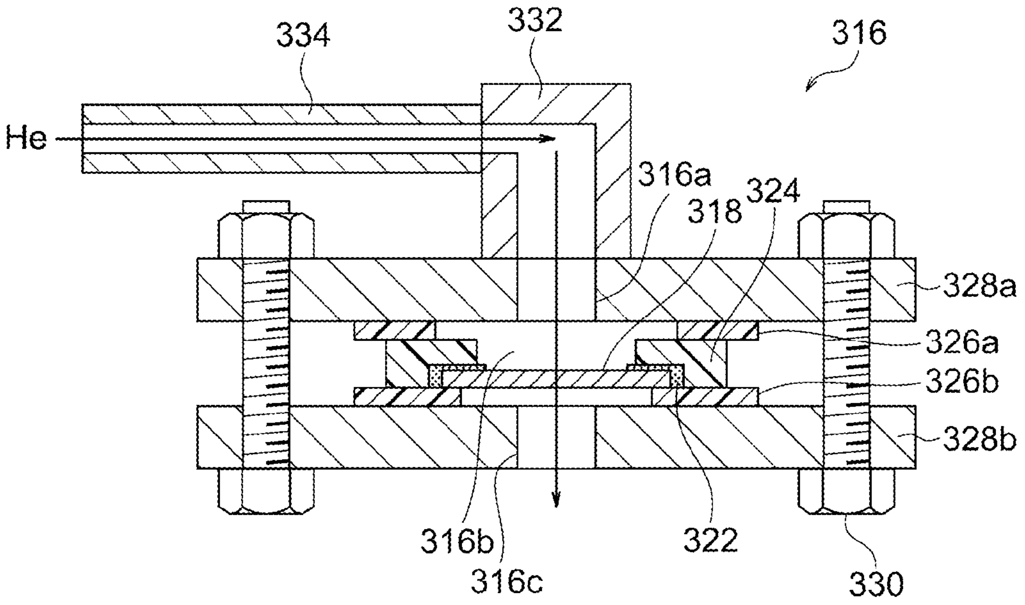
FIG. 4B is a schematic cross-sectional view of a sample holder used in the measurement system shown in FIG. 4A and peripheral configuration thereof.

Measurement of He permeability can be preferably carried out according to the following procedure. First, a He permeability measurement system 310 shown in FIGS. 4A and 4B is constructed. He permeability measurement system 310 is configured so that He gas from a gas cylinder filled with He gas is supplied to a sample holder 316 via a pressure gauge 312 and a flow meter 314 (digital flow meter), and is allowed to pass from one surface of LDH separator 318 held in sample holder 316 to the other surface to be discharged.

Sample holder 316 has a structure comprising a gas supply port 316*a*, a closed space 316*b*, and a gas discharge port 316*c*, and is assembled as follows. First, the outer circumference of LDH separator 318 is coated with an adhesive 322 and attached to a jig 324 (made of ABS resin) having an opening in the center. Packings made of butyl rubber are arranged as sealing members 326*a* and 326*b* at the upper end and lower end of this jig 324, and then sealing members 326*a*, 326*b* are sandwiched from outside thereof with support members 328*a* and 328*b* (made of PTFE) with openings, composed of flanges. In this way, closed space 316*b* is defined by LDH separator 318, jig 324, sealing member 326*a*, and support member 328*a*. Support members 328*a* and 328*b* are fastened tightly to each other by a fastening means 330 using screws so that He gas does not leak from a portion other than gas discharge port 316*c*. A gas supply pipe 334 is connected to gas supply port 316*a* of sample holder 316 thus assembled via a fitting 332.

Next, He gas is supplied to He permeability measurement system 310 through gas supply pipe 334 and is allowed to pass through LDH separator 318 held by sample holder 316. At this time, gas supply pressure and a flow rate are monitored by pressure gauge 312 and flow meter 314. After the passage of the He gas for 1 to 30 minutes, the He permeability was calculated. The He permeability was calculated by using the formula: F/(P×S), wherein F ($cm^3$/min) is the amount of the He gas passing per unit time, P (atm) is the differential pressure applied to the LDH separator when the He gas passes, and S ($cm^2$) is the membrane area through which the He gas passes. The amount F ($cm^3$/min) of He gas passing was read directly from flow meter 314. Further, differential pressure P is determined by using the gauge pressure read from pressure gauge 312. The He gas is supplied so that differential pressure P is within a range of from 0.05 to 0.90 atm.

In LDH separator 12, hydroxide ion conductive layered compound 12*b*, which is an LDH and/or LDH-like compound, clogs up the pores of porous substrate 12*a*. As is generally known, LDH is composed of a plurality of hydroxide basic layers and an intermediate layer interposed between the plurality of hydroxide basic layers. The basic hydroxide layer is mainly composed of metal elements (typically metal ions) and OH groups. The intermediate layer of LDH is composed of anions and $H_2O$. The anion is a mono- or higher-valent anion and preferably a monovalent or divalent ion.

The anion in LDH preferably contains $OH^-$ and/or $CO_3^{2-}$. LDH also has excellent ion conductivity due to its unique properties.

In general, LDH has been known as a compound represented by the basic composition formula: $M^{2+}_{1-x}M^{3+}_x(OH)_2A^{n-}_{x/n}\cdot mH_2O$ wherein $M^{2+}$ is a divalent cation, $M^{3+}$ is a trivalent cation, $A^{n-}$ is an n-valent anion, n is an integer of 1 or more, x is 0.1 to 0.4, and m is 0 or more. In the above basic composition formula, $M^{2+}$ can be arbitrary divalent cation, but preferred examples thereof include $Mg^{2+}$, $Ca^{2+}$ and $Zn^{2+}$, and it is more preferably $Mg^{2+}$. $M^{3+}$ can be arbitrary trivalent cation, a preferred example thereof includes $Al^{3+}$ or $Cr^{3+}$, and it is more preferably $Al^{3+}$. $A^{n-}$ can be arbitrary anion, and preferred examples thereof include $OH^-$ and $Co_3^{2-}$. Therefore, in the above basic composition formula, it is preferred that $M^{2+}$ include $Mg^{2+}$, $M^{3+}$ include $Al^{3+}$, and $A^{n-}$ include $OH^-$ and/or $CO_3^{2-}$. n is an integer of 1 or more, and is preferably 1 or 2. x is 0.1 to 0.4 and preferably 0.2 to 0.35. m is an arbitrary numeral meaning the number of moles of water, is greater than or equal to 0, typically a real number greater than 0 or greater than or equal to 1. However, the above basic composition formula is merely a representatively exemplified formula of the "basic composition" of LDH, generally, and the constituent ions can be appropriately replaced. For example, in the above basic composition formula, some or all of $M^{3+}$ may be replaced with a tetra- or higher-valent cation, and in that case, the coefficient x/n of anion $A^{n-}$ in the above formula may be appropriately changed.

For example, the hydroxide basic layer of LDH may contain Ni, Al, Ti and OH groups. The intermediate layer is composed of anions and $H_2O$ as described above. The alternating laminated structure of the hydroxide basic layer and the intermediate layer, itself is basically the same as the generally known LDH alternating laminated structure, but the LDH of the present embodiment in which the hydroxide basic layer of LDH is composed of predetermined elements or ions including Ni, Al, Ti and OH groups can exhibit excellent alkali resistance. The reason for this is not necessarily clear, but it is considered that Al, which has been conventionally thought to be easy to elute in an alkaline solution, is less likely to elute in an alkaline solution due to some interaction with Ni and Ti in the LDH of the present embodiment. Nevertheless, LDH of the present embodiment can also exhibit high ion conductivity suitable for use as a separator for an alkaline secondary battery. Ni in LDH can be in the form of nickel ions. Nickel ions in LDH are typically considered to be $Ni^{2+}$ but are not particularly limited thereto as other valences such as $Ni^{3+}$ are possible. Al in LDH can be in the form of aluminum ions. Aluminum ions in LDH are typically considered to be $Al^{3+}$ but are not particularly limited thereto as other valences are possible. Ti in LDH can be in the form of titanium ions. Titanium ions in LDH are typically considered to be $Ti^{4+}$ but are not particularly limited thereto as other valences such as $Ti^{3+}$ are possible. The hydroxide basic layer may contain other elements or ions as long as it contains at least Ni, Al, Ti and OH groups. However, the hydroxide basic layer preferably contains Ni, Al, Ti and OH groups as main components. Namely, the hydroxide basic layer is preferably mainly composed of Ni, Al, Ti and OH groups. Therefore, the hydroxide basic layer is typically composed of Ni, Al, Ti, OH groups and, in some cases, unavoidable impurities. The unavoidable impurity is an arbitrary element that can be unavoidably mixed due to the production process, and can be mixed in LDH, for example, derived from a raw material or a substrate. As described above, the valences of Ni, Al and Ti are not always fixed, and it is impractical or impossible to specify LDH strictly by a general formula. Assuming that the hydroxide basic layer is mainly composed of $Ni^{2+}$, $Al^{3+}$, $Ti^{4+}$ and OH groups, the corresponding LDH has the basic composition that can be represented by the formula: $Ni^{2+}_{1-x-y}Al^{3+}_xTi^{4+}_y(OH)_2A^{-}_{(x+2y)/n}\cdot mH_2O$ wherein $A^{n-}$ is an n-valent anion, n is an integer of 1 or more and preferably 1 or 2, $0<x<1$ and preferably $0.01\le x\le 0.5$, $0<y<1$ and preferably $0.01\le y\le 0.5$, $0<x+y<1$, m is 0 or more and typically a real number greater than 0 or greater than or equal to 1. However, the above formula is understood as "basic composition", and it is understood that elements such as $Ni^{2+}$, $Al^{3+}$, and $Ti^{4+}$ are replaceable with other elements or ions (including the same elements or ions having other valences, or elements or ions unavoidably mixed due to the production process) to an extent such that the basic characteristics of LDH are not impaired.

LDH-like compound is a hydroxide and/or oxide having a layered crystal structure like to LDH but is a compound that may not be called LDH. Preferred LDH-like compounds will be discussed below. By using an LDH-like compound that is a hydroxide and/or oxide having a layered crystal structure with the predetermined composition described below, instead of the conventional LDH, as the hydroxide ion conductive substance, a hydroxide ion conductive separator can be provided that is excellent in the alkali resistance and capable of inhibiting a short circuit due to zinc dendrite even more effectively.

As described above, LDH separator 12 contains hydroxide ion conductive layered compound 12*b* and porous substrate 12*a* (typically LDH separator 12 is composed of porous substrate 12*a* and hydroxide ion conductive layered compound 12*b*), and the hydroxide ion conductive layered compound clogs up pores of the porous substrate so that LDH separator 12 exhibits hydroxide ion conductivity and gas impermeability (hence to function as an LDH separator exhibiting hydroxide ion conductivity). Hydroxide ion conductive layered compound 12*b* is particularly preferably incorporated over the entire area of polymer porous substrate 12*a* in the thickness direction. The thickness of the LDH separator is preferably 3 to 80 μm, more preferably 3 to 60 μm, and still more preferably 3 to 40 μm.

Porous substrate 12*a* is made of a polymer material. Polymer porous substrate 12*a* has advantages of 1) having flexibility (hence, polymer porous substrate 12*a* hardly cracks even when it is thin.), 2) facilitating increase in porosity, and 3) facilitating increase in conductivity (it can be thin while having increased porosity.), and 4) facilitating manufacture and handling. Further, taking advantage derived from the flexibility of 1) above, it also has an advantage of 5) ease in bending or sealing/bonding the LDH separator containing a porous substrate made of a polymer material. Preferred examples of the polymer material include polystyrene, polyether sulfone, polypropylene, an epoxy resin, polyphenylene sulfide, a fluororesin (tetrafluororesin: PTFE, etc.), cellulose, nylon, polyethylene and any combination thereof. In view of a thermoplastic resin suitable for heat pressing, more preferred examples include polystyrene, polyether sulfone, polypropylene, an epoxy resin, polyphenylene sulfide, a fluororesin (tetrafluororesin: PTFE, etc.), nylon, polyethylene and any combination thereof. All of the various preferred materials described above have the alkali resistance, which serves as a resistance to the electrolytic solution of the battery. Particularly preferable polymer materials are polyolefins such as polypropylene and polyethylene and most preferably polypropylene or polyethylene in terms of excellent hot water resistance, acid resistance and alkali resistance as well low cost. When the porous substrate is made of a polymer material, the hydroxide ion conductive layered compound is particularly preferably incorporated over the entire porous substrate in the thickness direction (for example, most or almost all of the pores inside the porous substrate are filled with the hydroxide ion conductive layered compound.). As such a polymer porous substrate, a commercially available polymer microporous membrane can be preferably used.

The LDH separator of the present embodiment can be produced by (i) fabricating the hydroxide ion conductive layered compound-containing composite material according to a known method (see, for example, Patent Literatures 1 to 3) by using a polymer porous substrate, and (ii) pressing this hydroxide ion conductive layered compound-containing composite material. The pressing method may be, for example, a roll press, a uniaxial pressure press, a CIP (cold isotropic pressure press), etc., and is not particularly limited. The pressing method is preferably by a roll press. This pressing is preferably carried out while heating in terms of softening the porous substrate to enable to clog up sufficiently the pores of the polymer porous substrate with the hydroxide ion conductive layered compound. For example, for polypropylene or polyethylene, the temperature for sufficient softening is preferably heated at 60 to 200° C. Pressing by, for example, a roll press in such a temperature range can significantly reduce the average porosity derived from the residual pores of the LDH separator; as a result, the LDH separator can be extremely highly densified, and hence short circuits due to zinc dendrites can be inhibited even more effectively. When carrying out the roll pressing, the form of the residual pores can be controlled by appropriately adjusting the roll gap and the roll temperature, whereby an LDH separator having a desired denseness or average porosity can be obtained.

The method for producing the hydroxide ion conductive layered compound-containing composite material (i.e., the crude LDH separator) before pressing is not particularly limited, and it can be fabricated by appropriately changing the conditions in a known method for producing an LDH-containing functional layer and a composite material (i.e., LDH separator) (see, for example, Patent Literatures 1 to 3). For example, the hydroxide ion conductive layered compound-containing functional layer and the composite material (i.e., an LDH separator) can be produced by (1) providing a porous substrate, (2) coating the porous substrate with a titanium oxide sol or a mixed sol of alumina and titania followed by heat treatment to form a titanium oxide layer or alumina/titania layer, (3) immersing the porous substrate in a raw material aqueous solution containing nickel ions ($Ni^{2+}$) and urea, and (4) treating hydrothermally the porous substrate in the raw material aqueous solution to form a hydroxide ion conductive layered compound-containing functional layer on the porous substrate and/or in the porous substrate. In particular, forming of the titanium oxide layer or the alumina/titania layer on the porous substrate in the above step (2) provides not only the raw material of the hydroxide ion conductive layered compound, but also the function as a starting point of the crystal growth of the hydroxide ion conductive layered compound to enable to form uniformly a highly densified hydroxide ion conductive layered compound-containing functional layer in the porous substrate. Further, the urea present in the above step (3) generates ammonia in the solution by utilizing the hydrolysis of the urea to raise the pH value, which allows the coexisting metal ions to form a hydroxide to obtain a hydroxide ion conductive layered compound. In addition, since the hydrolysis involves the generation of carbon dioxide, a hydroxide ion conductive layered compound having an anion of carbonate ion type can be obtained.

In particular, when fabricating a composite material including a porous substrate made of a polymer material in which the functional layer is incorporated over the entire porous substrate in the thickness direction (i.e., an LDH separator), the substrate is preferably coated with the mixed sol of alumina and titania in the above (2) so as to permeate the whole or most of the inside of the substrate with the mixed sol. In this way, most or almost all the pores inside the porous substrate can be finally filled with the hydroxide ion conductive layered compound. Examples of a preferable coating method include a dip coating and a filtration coating, and a dip coating is particularly preferable. By adjusting the number of times of coating by the dip coating, etc., the amount of the mixed sol adhered can be adjusted. The substrate coated with the mixed sol by dip coating, etc. may be dried and then the above steps (3) and (4) may be carried out.

LDH-Like Compounds

According to a preferred aspect of the present invention, the LDH separator can be a separator that contains an LDH-like compound. The definition of the LDH-like compound is as described above. Preferred LDH-like compounds are as follows, (a) a hydroxide and/or oxide having a layered crystal structure containing Mg and one or more elements selected from the group consisting of Ti, Y, and Al, and containing at least Ti; or (b) a hydroxide and/or oxide having a layered crystal structure containing (i) Ti, Y, optionally Al and/or Mg, and (ii) at least one additive element M selected from the group consisting of In, Bi, Ca, Sr and Ba, or (c) a hydroxide and/or oxide having a layered crystal structure containing Mg, Ti, Y, optionally Al and/or In, wherein in (c), the LDH-like compound is present in a form of mixture with $In(OH)_3$.

According to the preferred aspect (a) of the present invention, the LDH-like compound can be a hydroxide and/or oxide having a layered crystal structure containing Mg and one or more elements selected from the group consisting of Ti, Y and Al and containing at least Ti. Thus, a typical LDH-like compound is a complex hydroxide and/or complex oxide of Mg, Ti, optionally Y and optionally Al. The above elements may be replaced with other elements or ions to an extent that the basic characteristics of the LDH-like compound are not impaired, but the LDH-like compound preferably contains no Ni. For example, the LDH-like compound may be a compound further containing Zn and/or K. In such a manner, ionic conductivity of the LDH separator can be further improved.

LDH-like compounds can be identified by X-ray diffraction. Specifically, when X-ray diffraction is carried out on the surface of the LDH separator, a peak assigned to the LDH-like compound is detected typically in the range of $5° \leq 2\theta \leq 10°$, and more typically in the range of $7° \leq 2\theta \leq 10°$. As described above, the LDH is a substance having an alternating laminated structure in which exchangeable anions and $H_2O$ are present as an intermediate layer between the stacked hydroxide basic layers. In this regard, when LDH is analyzed by the X-ray diffraction method, a peak assigned to the crystal structure of LDH (i.e., the peak assigned to (003) of LDH) is originally detected at a position of 2θ=11 to 12°. When the LDH-like compound is analyzed by the X-ray diffraction method, on the other hand, a peak is typically detected in the aforementioned range shifted to the lower angle side than the above peak position of LDH. Further, the interlayer distance of the layered crystal structure can be determined by Bragg's equation using 2θ corresponding to the peak assigned to the LDH-like compound in X-ray diffraction. The interlayer distance of the layered crystal structure of the LDH-like compound thus determined is typically 0.883 to 1.8 nm, and more typically 0.883 to 1.3 nm.

The LDH separator by the aforementioned aspect (a) has an atomic ratio of Mg/(Mg+Ti+Y+Al) in the LDH-like compound, as determined by energy dispersive X-ray spectroscopy (EDS), which is preferably 0.03 to 0.25 and more preferably 0.05 to 0.2. Moreover, the atomic ratio of Ti/(Mg+Ti+Y+Al) in the LDH-like compound is preferably 0.40 to 0.97 and more preferably 0.47 to 0.94. Further, the atomic ratio of Y/(Mg+Ti+Y+Al) in the LDH-like compound is preferably 0 to 0.45 and more preferably 0 to 0.37. Further, the atomic ratio of Al/(Mg+Ti+Y+Al) in the LDH-like compound is preferably 0 to 0.05 and more preferably 0 to 0.03. Within the above ranges, the alkali resistance is more excellent, and the effect of inhibiting a short circuit due to zinc dendrite (i.e., dendrite resistance) can be more effectively realized. By the way, LDH conventionally known for LDH separators has the basic composition that can be represented by the formula: $M^{2+}_{1-x}M^{3+}_{x}(OH)_2A^{n-}_{x/n}\cdot mH_2O$, wherein $M^{2+}$ is a divalent cation, $M^{3+}$ is a trivalent cation, $A^{n-}$ is an n-valent anion, n is an integer of 1 or more, x is 0.1 to 0.4, and m is 0 or more. The atomic ratios in the LDH-like compound generally deviate from those in the above formula for LDH. Therefore, the LDH-like compound in the present aspect generally can be said to have a composition ratio (atomic ratio) different from that of the conventional LDH. EDS analysis is preferably carried out with an EDS analyzer (for example, X-act, manufactured by Oxford Instruments Plc.), by 1) capturing an image at an acceleration voltage of 20 kV and a magnification of 5,000×, 2) carrying out three-point analysis at intervals of about 5 μm in the point analysis mode, 3) repeating the above 1) and 2) once more, and 4) calculating the average value of a total of 6 points.

According to another preferred aspect (b) of the present invention, the LDH-like compound can be a hydroxide and/or oxide having a layered crystal structure containing (i) Ti, Y, and optionally Al and/or Mg and (ii) additive element M. Therefore, a typical LDH-like compound is a complex hydroxide and/or complex oxide of Ti, Y, additive element M, optionally Al and optionally Mg. Additive element M is In, Bi, Ca, Sr, Ba or combinations thereof. The above elements may be replaced with other elements or ions to an extent such that the basic characteristics of the LDH-like compound are not impaired, but the LDH-like compound preferably contains no Ni.

The LDH separator by the aforementioned aspect (b) has an atomic ratio of Ti/(Mg+Al+Ti+Y+M) in the LDH-like compound, as determined by energy dispersive X-ray spectroscopy (EDS), which is preferably 0.50 to 0.85 and more preferably 0.56 to 0.81. The atomic ratio of Y/(Mg+Al+Ti+Y+M) in the LDH-like compound is preferably 0.03 to 0.20 and more preferably 0.07 to 0.15. The atomic ratio of M/(Mg+Al+Ti+Y+M) in the LDH-like compound is preferably 0.03 to 0.35 and more preferably 0.03 to 0.32. The atomic ratio of Mg/(Mg+Al+Ti+Y+M) in the LDH-like compound is preferably 0 to 0.10 and more preferably 0 to 0.02. Then, the atomic ratio of Al/(Mg+Al+Ti+Y+M) in the LDH-like compound is preferably 0 to 0.05 and more preferably 0 to 0.04. Within the above ranges, the alkali resistance is more excellent, and the effect of inhibiting a short circuit due to zinc dendrite (i.e., dendrite resistance) can be more effectively realized. By the way, LDH conventionally known for LDH separators has the basic composition that can be represented by the formula: $M^{2+}_{1-x}M^{3+}_{x}(OH)_2A^{n-}_{x/n}\cdot mH_2O$, wherein $M^{2+}$ is a divalent cation, $M^{3+}$ is a trivalent cation, $A^{n-}$ is an n-valent anion, n is an integer of 1 or more, x is 0.1 to 0.4, and m is 0 or more. The atomic ratios in the LDH-like compound generally deviate from those in the above formula for LDH. Therefore, the LDH-like compound in the present aspect generally can be said to have a composition ratio (atomic ratio) different from that of the conventional LDH. EDS analysis is preferably carried out with an EDS analyzer (for example, X-act, manufactured by Oxford Instruments Plc.), by 1) capturing an image at an acceleration voltage of 20 kV and a magnification of 5,000×, 2) carrying out three-point analysis at intervals of about 5 μm in the point analysis mode, 3) repeating the above 1) and 2) once more, and 4) calculating the average value of a total of 6 points.

According to another further preferred aspect (c) of the present invention, the LDH-like compound can be a hydroxide and/or oxide having a layered crystal structure containing Mg, Ti, Y, and optionally Al and/or In, wherein the LDH-like compound is present in a form of mixture with $In(OH)_3$. The LDH-like compound in this aspect is a hydroxide and/or oxide having a layered crystal structure containing Mg, Ti, Y, and optionally Al and/or In. Therefore, a typical LDH-like compound is a complex hydroxide and/or complex oxide of Mg, Ti, Y, optionally Al and optionally In. The In that can be contained in the LDH-like compound may be not only In intentionally added to the LDH-like compound but also that unavoidably mixed into the LDH-like compound, due to formation of $In(OH)_3$ or the like. The above elements can be replaced with other elements or ions to an extent that the basic characteristics of the LDH-like compound are not impaired, however, the LDH-like compound preferably contains no Ni. By the way, LDH conventionally known for LDH separators has the basic composition that can be represented by the formula: $M^{2+}_{1-x}M^{3+}_{x}(OH)_2A^{n-}_{x/n}\cdot mH_2O$, wherein $M^{2+}$ is a divalent cation, $M^{3+}$ is a trivalent cation, $A^{n-}$ is an n-valent anion, n is an integer of 1 or more, x is 0.1 to 0.4, and m is 0 or more. The atomic ratios in the LDH-like compound generally deviate from those in the above formula for LDH. Therefore, the LDH-like compound in the present aspect generally can be said to have a composition ratio (atomic ratio) different from that of the conventional LDH.

The mixture by the above aspect (c) contains not only the LDH-like compound but also $In(OH)_3$ (typically composed of the LDH-like compound and $In(OH)_3$). $In(OH)_3$ contained can effectively improve alkali resistance and dendrite resistance in LDH separators. The content proportion of $In(OH)_3$ in the mixture is preferably the amount that can improve alkali resistance and dendrite resistance with little impairment of hydroxide ion conductivity of the LDH separator, and is not particularly limited. $In(OH)_3$ may have a cubic crystal structure, and have a configuration in which the crystals of $In(OH)_3$ are surrounded by LDH-like compounds. $In(OH)_3$ can be identified by X-ray diffraction.

What is claimed is:

1. An air electrode/separator assembly, comprising:

a hydroxide ion conductive separator comprising a hydroxide ion conductive solid electrolyte;

an air electrode layer that is provided on one side of the hydroxide ion conductive separator and that comprises a hydroxide ion conductive material, an electron conductive material, and an air electrode catalyst, provided that the hydroxide ion conductive material may be the same material as the hydroxide ion conductive solid electrolyte or the air electrode catalyst, and provided that the electron conductive material may be the same material as the air electrode catalyst; and an interface layer between the hydroxide ion conductive separator and the air electrode layer, wherein the interface layer comprises:

a plurality of platy particles composed of a hydroxide ion conductive solid electrolyte grown in a direction away from a surface of the hydroxide ion conductive separator, and an electron conductive material provided so as to fill a gap between the plurality of platy particles and/or unevenness formed by the plurality of platy particles; and wherein the interface layer has a thickness of 150 nm or smaller and wherein the air electrode layer has a thickness of 300 nm or smaller.

2. The air electrode/separator assembly according to claim 1, wherein the air electrode layer comprises:

a plurality of electron conductive segments composed of the electron conductive material, the electron conductive segments being provided on the interface layer with a gap between each other; and the hydroxide ion conductive material and the air electrode catalyst that are provided on the electron conductive segment.

3. The air electrode/separator assembly according to claim 1, wherein the hydroxide ion conductive material comprised in the air electrode layer is a layered double hydroxide (LDH) and/or an LDH-like compound, wherein the electron conductive material comprised in the air electrode layer is at least one selected from the group consisting of a metallic material, a conductive ceramic, and a carbon material, and wherein the air electrode catalyst comprised in the air electrode layer is at least one selected from the group consisting of a layered double hydroxide (LDH) and other metal hydroxide, a metal oxide, a metal nanoparticle, and a carbon material.

4. The air electrode/separator assembly according to claim 1, wherein the hydroxide ion conductive material comprised in the interface layer is a layered double hydroxide (LDH) and/or an LDH-like compound.

5. The air electrode/separator assembly according to claim 1, wherein the hydroxide ion conductive solid electrolyte is a layered double hydroxide (LDH) and/or an LDH-like compound, whereby the hydroxide ion conductive separator forms an LDH separator.

6. The air electrode/separator assembly according to claim 5, wherein the LDH separator is composited with a porous substrate.

7. A metal-air secondary battery, comprising the air electrode/separator assembly according to claim 1, a metal negative electrode, and an electrolytic solution, wherein the electrolytic solution is separated from the air electrode layer by the hydroxide ion conductive separator interposed therebetween.

* * * * *